United States Patent
Comstock et al.

[15] 3,668,178
[45] *June 6, 1972

[54] UNSATURATED POLYESTER RESINS ADMIXED WITH CYCLIC ESTER POLYMERS

[72] Inventors: Lowell R. Comstock, South Charleston; Percy L. Smith, Dunbar, both of W. Va.

[73] Assignee: Union Carbide Corporation, New York, N.Y.

[*] Notice: The portion of the term of this patent subsequent to Dec. 22, 1987, has been disclaimed.

[22] Filed: Aug. 28, 1970

[21] Appl. No.: 68,051

Related U.S. Application Data

[63] Continuation-in-part of Ser. No. 812,383, Apr. 1, 1969, Pat. No. 3,549,586.

[52] U.S. Cl. ............................260/40 R, 260/861
[51] Int. Cl. ...........................................C08g 51/04
[58] Field of Search........................260/40 R, 861

[56] References Cited

UNITED STATES PATENTS

| | | | |
|---|---|---|---|
| 3,549,586 | 12/1970 | Smith et al. | 260/40 R |
| 2,645,626 | 7/1963 | Nordlander et al. | 260/40 |
| 3,431,320 | 3/1969 | Baum et al. | 260/40 R X |
| 3,432,458 | 3/1969 | Kwan et al. | 260/40 R X |
| 2,887,461 | 5/1959 | Hort | 260/40 R |
| 2,628,209 | 2/1953 | Fisk | 260/40 R |
| 3,465,061 | 9/1969 | Fekete et al. | 260/40 R X |

FOREIGN PATENTS OR APPLICATIONS

| | | | |
|---|---|---|---|
| 502,328 | 5/1954 | Canada | 260/40 R |
| 1,127,939 | 9/1968 | Great Britain | 260/40 R |

OTHER PUBLICATIONS

Simonds et al.; Handbook of Plastics, 2nd Edition; 1949; D. Van Nostrand Co., Inc.; pages 304, 307, & 310; Sci. Lib., TP 986 A2S48 1949.

*Primary Examiner*—Lewis T. Jacobs
*Attorney*—Paul A. Rose, A. J. Cozzi and James C. Arvantes

[57] ABSTRACT

The disclosure of this application is directed to unsaturated polyester compositions, containing a polymer of a cyclic ester having an average of at least one carboxyl group per molecule, which have particular utility in sheet molding applications to form thermoset articles characterized by excellent impact strength and by excellent surface properties such as excellent smoothness, excellent receptiveness to paints and excellent reproduction of the surface contours of the mold in which they are formed into shaped, thermoset articles.

25 Claims, No Drawings

UNSATURATED POLYESTER RESINS ADMIXED WITH CYCLIC ESTER POLYMERS

This application is a continuation-in-part of our copending application Ser. No. 812,383, filed Apr. 1, 1969 now U.S. Pat. No. 3,549,586, granted Dec. 22, 1970.

This invention relates to unsaturated polyester compositions containing a polymer of a cyclic ester having an average of at least one carboxyl group per molecule. More specifically, this invention relates to unsaturated polyester compositions, as described, which have particular utility in sheet molding applications to form thermoset articles such as fenders, dashboards and other like component parts of automobiles, characterized by excellent impact strength and by excellent surface properties including excellent smoothness, excellent receptiveness to paints and excellent reproduction of the surface contours of the mold in which they are formed into shaped, thermoset articles.

Compositions, based on unsaturated polyesters, are finding increased use in the automotive industry as compositions from which can be molded fenders, dash-boards and other like component parts of automobiles. As a general rule, these compositions contain, in addition to the unsaturated polyesters, so-called low-profile additives such as poly(methyl methacrylate). A low-profile additive is a material designed to insure that there is no undesirable shrinkage by the composition, to which the additive has been added, as the composition is being molded into a thermoset article. In other words, low-profile additives have been added to unsaturated polyester compositions for the purpose of obtaining compositions which can be molded into thermoset articles, the surfaces of which truly reflect the surface characteristics of the mold.

It has been found, however, that although the use of low-profile additives, as described, does effect some degree of improvement in the anti-shrinkage characteristics of the unsaturated polyester compositions, the improvement is more than offset by other problems occasioned by these low-profile additives when the compositions to which they have been added are to be used in sheet-molding applications. Sheet-molding applications involve forming the compositions into sheet material, winding the sheeted material into rolls, allowing the sheeted compositions to gel or B-stage and thereafter, as the need arises, unwinding and molding the sheeted material into thermoset articles of desired shape. Low-profile additives, as described, tend to migrate to and exude from the surfaces of the compositions during the gelling or B-staging operation. As a result, the sheeted compositions become oily and sticky, at their surfaces, and present obvious handling and processing problems.

The present invention provides unsaturated polyester compositions which, in addition to possessing the advantages previously discussed, can be formed into sheets and gelled or B-staged to surface dry material which can be readily and easily handled and processed.

The compositions of this invention comprise an unsaturated polyester and a polymer of a cyclic ester having an average of at least one carboxyl group per molecule, generally an average of one to about ten and preferably one to about two carboxyl groups per molecule wherein the polymer of a cyclic ester is present in an amount of about 1 to about 60 percent by weight and preferably about 1 to about 40 percent by weight based on the weight of the unsaturated polyester.

The unsaturated polyesters which are admixed with the polymers of cyclic esters, as previously described, to provide the compositions of this invention are condensation reaction products of an unsaturated polycarboxylic acid and a polyol and generally have an average molecular weight of about 500 to about 10,000, preferably about 1,000 to about 6,000, which based on an acid number have an acid number less than about 100.

Illustrative of suitable unsaturated polycarboxylic acids which are condensed with the polyols to produce the unsaturated polyesters of this invention are those having the formula:

Formula I $$C_nH_{2n-2}(COOH)_2$$

wherein $n$ is an integer having a value of 2 to 20 inclusive, preferably 2 to 10 inclusive. Among such acids can be noted maleic acid, fumaric acid, allylmalonic acid, propylidene malonic acid, hydromuconic acid, pyrocinchonic acid, allylsuccinic acid, carbocaprolactonic acid, teraconic acid, xeronic acids, cytylmalonic acid and other like ethylenically unsaturated acids.

Other suitable unsaturated polycarboxylic acids falling within the scope of Formula I are the following: glutaconic acid, citraconic acid, itaconic acid, ethidene-malonic acid, mesaconic acid and other like ethylenically unsaturated acids.

Other suitable ethylenically unsaturated acids include nuconic acid, $\alpha$-hydromuconic acid, $\beta$-hydromuconic acid, 4-amyl-2,5-heptadienedioic acid, 3-hexynedioic acid, tetrahydrophthalic acid, 3-carboxy cinamic acid and the like.

If desired, the acid anhydrides of the acids previously described can be used per se or in admixture with the acids to produce the unsaturated polyesters of this invention.

In addition to the anhydrides of the acids noted above, the following acid anhydrides can also be used: pentenyl succinic anhydride, octenyl succinic anhydride, nonenyl succinic anhydride, chloromaleic anhydride, dichloromaleic anhydride, hexachloroendomethylene tetrahydrophthalic anhydride, commonly referred to as chlorendic anhydride, the Diels-Alder adducts of maleic acid and alicyclic compounds having conjugated double bonds such as methylbicyclo-[2,2,1]-hepten-2,3-dicarboxylic anhydride and the like.

If desired, aromatic polycarboxylic acids, saturated polycarboxylic acids, anhydrides thereof or monocarboxylic acids can be used, in conjunction with the unsaturated polycarboxylic acids or the anhydrides thereof, to produce the unsaturated polyesters.

Illustrative of saturated polycarboxylic or aromatic polycarboxylic acids include, among others, phthalic acid, hexahydrophthalic acid, tetrachlorophthalic acid, succinic acid, adipic acid, suberic acid, azelaic acid, sebacic acid, dimethyl succinic acid and the like as well as derivatives thereof, e.g., chlorinated derivatives.

Among suitable monocarboxylic acids, which usually contain a maximum of 22 carbon atoms, are benzoic acid, hexanoic acid, caprylic acid, lauric acid, caproic acid, myristic acid, palmitic acid, stearic acid, arachidic acid, palmitoleic acid, oleic acid, linoleic acid, linolenic acid, eleostearic acid, licanic acid, ricinoleic acid, hexenoic acid, hexadienoic acid, octenoic acid, and the like. It is advantageous for purposes of economy to employ mixtures of acids, particularly those derived from natural sources such as castor oil, dehydrated castor oil, coconut oil, cottonseed oil, linseed oil, oiticaca oil, perilla oil, olive oil, safflower oil, sardine oil, soybean oil, tall oil, tung oil (China wood oil), and the like.

Illustrative of suitable polyols for purposes of this invention are the dihydric alcohols having the formula:

Formula III

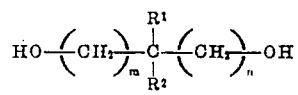

wherein the sum of $m + n$ is at least 1, preferably 1 to 20 inclusive and $R^1$ and $R^2$, which can be the same or different, are hydrogen or alkyl and when alkyl, containing one to 20 carbon atoms inclusive. Specific compounds include, among others, ethylene glycol, propylene glycol, butanediol-1,2, butanediol-1,3, butanediol-1,4, hexanediol-1,6, decanediol-1,10, neopentyl glycol and the like.

Also suitable are the ether diols having the formula:

Formula IV $$HO-(C_aH_{2a}O)_x-H$$

wherein $a$ has a value of at least 1, preferably 2 to 6 inclusive, and $x$ has a value of at least 2, preferably 2 to 10 inclusive. Among compounds falling within the scope of this formula are diethylene glycol, dipropylene glycol, triethylene glycol, tetraethylene glycol, and the like.

Other suitable polyols are the tetrahydric compounds such as pentaerythritol, dipentaerythritol, di-glycerol, pentaglycerol, polyvinyl alcohol and the like.

Preparation of unsaturated polyesters can be carried out by methods well known in the art. As a rule, the condensation reaction is conducted by reacting a mixture containing an unsaturated polycarboxylic acid and a polyol, in an amount of about 2 to about 15 percent in molar excess with respect to the polycarboxylic acid, at temperatures on the order of about 160° C. to about 250° C., preferably about 175° C. to about 225° C., to polyesters having an acid number of less than about 100, generally about 10 to about 60, preferably about 25 to about 50.

Polymers of cyclic esters having an average of at least one carboxyl group per molecule, which can be used in accordance with this invention, are those which possess a reduced viscosity of at least about 0.1, preferably about 0.15 to about 15 and higher. The preferred polymers of cyclic esters have a reduced viscosity of about 0.2 to about 10.

Suitable polymers are further characterized by the following basic recurring structural Unit I:

Unit I
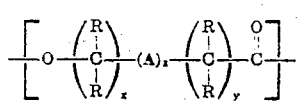

wherein each R, which can be the same or different, is hydrogen, halogen, i.e., chlorine, bromine, iodine or fluorine, or a monovalent hydrocarbon radical generally containing a maximum of 12 carbon atoms and preferably containing a maximum of eight carbon atoms; A is an oxy group; $x$ is an integer having a value of 1 to 4 inclusive; $y$ is an integer having a value of 1 to 4 inclusive; $z$ is an integer having a value of 0 or one; with the provisos that (a) the sum of $x + y + z$ is 4 to 6 inclusive and (b) the total number of R variables which are substituents other than hydrogen does not exceed 3 and preferably does not exceed 2.

Illustrative of suitable monovalent hydrocarbon radicals for R are the following: alkyl radicals such as methyl, ethyl, isopropyl, n-butyl, sec-butyl, t-butyl, n-hexyl, 2-ethylhexyl, n-dodecyl, chloroethyl, chloropropyl and the like; alkoxy radicals such as methoxy, ethoxy, n-propoxy, n-hexoxy, n-dodecoxy and the like; aryl radicals such as phenyl, ethylphenyl, n-propylphenyl, n-butylphenyl and the like; aryloxy radicals such as phenoxy, n-propylphenoxy, n-butylphenoxy and the like; cycloaliphatic radicals such as cyclopentyl, cyclohexyl and the like.

In one embodiment, desirable polymers of cyclic esters which are contemplated are characterized by both basic recurring structural Unit I supra and basic recurring structural Unit II, as are obtained from a mixture containing a cyclic ester and a cyclic monomer such as an alkylene oxide exemplified by ethylene oxide, propylene oxide and the like.

Unit II
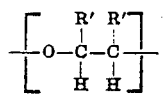

wherein each R', is as defined for R of Unit I or in which the two R' variables together with the ethylene moiety of the oxyethylene chain of Unit II form a saturated cycloaliphatic hydrocarbon ring having from four to eight carbon atoms inclusive, preferably from five to six carbon atoms inclusive. It is preferred that recurring Unit II contains from two to 12 carbon atoms inclusive. The interconnection of Unit I and Unit II supra does not involve or result in the direct bonding of two oxy groups, i.e., —O—O—. In other words, the oxy group (—O—) of recurring Unit II is interconnected with the carbonyl group

of recurring Unit I supra or with the alkylene moiety of a second oxyalkylene Unit II.

Particularly preferred polymers of cyclic esters are those which are characterized by the oxypentamethylene-carbonyl chain as seen in basic recurring structural Unit III:

Unit III
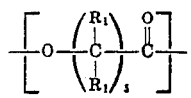

wherein each $R_1$ is hydrogen or lower alkyl, that is alkyl having a maximum of 4 carbon atoms, preferably hydrogen or methyl, with the proviso that no more than three $R_1$ variables are substituents other than hydrogen.

Suitable cyclic esters which can be used to produce the polymers of this invention can be represented by the following formula:

Formula V
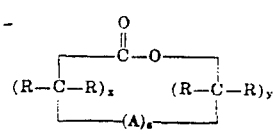

wherein each R, which can be the same or different, is hydrogen, halogen, i.e., chlorine, bromine, iodine or fluorine, or a monovalent hydrocarbon radical generally containing a maximum of 12 carbon atoms and preferably containing a maximum of eight carbon atoms; A is an oxy group, $x$ is an integer having a value of 1 to 4 inclusive; $y$ is an integer having a value of 1 to 4 inclusive; $z$ is an integer having a value of 0 or 1; with the provisos that (a) the sum of $x + y + z$ is 4 to 6 inclusive and (b) the total number of R variables which are substituents other than hydrogen does not exceed 3 and preferably does not exceed 2.

Illustrative of suitable monovalent hydrocarbon radicals for R are the following: alkyl radicals such as methyl, ethyl, isopropyl, n-butyl, sec-butyl, t-butyl, n-hexyl, 2-ethylhexyl, n-dodecyl and the like; alkoxy radicals such as methoxy, ethoxy, n-propoxy, n-hexoxy, n-dodecoxy and the like; aryl radicals such as phenyl, ethylphenyl, n-propylphenyl, n-butylphenyl and the like; aryloxy radicals such as phenoxy, n-propylphenoxy, n-butyl-phenoxy and the like; cycloaliphatic radicals such as cyclopentyl, cyclohexyl and the like as well as halo substituted monovalent hydrocarbon radicals.

Particularly desirable cyclic esters are those having the formula:

Formula VI
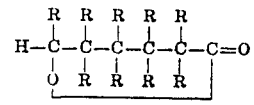

wherein R is as previously defined and at least six R's are hydrogen.

Specific cyclic esters falling within the scope of Formula V are the following: delta-valerolactone, epsilon-caprolactone, zeta-enantholactone, the monoalkyl-delta-valerolactones, e.g., the monomethyl-, monoethyl-, monohexyl-, delta-valerolactones, and the like; the di-alkyl-delta-valerolactones, e.g., the dimethyl-, diethyl-, and di-n-octyl-delta-valerolactones, and the like; the monoalkyl-dialkyl-, and tri-alkyl-epsilon-caprolactones, e.g., the monomethyl-, monoethyl-, monohexyl-, dimethyl-, diethyl-, di-n-propyl, di-n-hexyl-, trimethyl-, triethyl-, and tri-n-propyl-epsilon-caprolactones, and the like; the monoalkoxy- and dialkoxy-delta-valerolactones and epsilon-caprolactone, e.g., monomethoxy-, monoisopropoxy-, dimethoxy-, and diethoxy-, delta-valerolactones and epsilon-caprolactones, and the like; 1,4-dioxane-2-one; and the like.

Particularly desirable ε-caprolactones, that is, lactones falling within the scope of Formula VI are the following: ε-caprolactone, β-methyl-ε-caprolactone, γ-methyl-ε-caprolactone, δ-methyl-ϵ caprolactone, ϵ methyl-ϵ caprolactone, β, δ-dimethyl-ϵ caprolactone, β-chloro-ϵ caprolactone, δ-ethoxy-ϵ caprolactone, ϵ phenyl-ϵ caprolactone and the like.

The carboxyl containing polymers of this invention can be prepared by polymerizing a cyclic ester, as defined, in the presence of water or of a functional initiator, having carboxyl groups which will result, in turn, in the resultant polymer having carboxyl groups.

In those instances wherein the functional initiator has hydroxyl or amino groups, the resultant polymer will have hydroxyl groups. These hydroxyl groups can then be capped with carboxyl groups by reaction with a polycarboxylic acid or anhydride, previously described in this specification, to provide a polymer having carboxyl groups.

Detailed procedures for producing carboxyl containing polymers by the use of functional initiators are described in: U.S. Pat. No. 2,878,236 to D. M. Young et al., patented Mar. 17, 1959; U.S. Pat. No. 2,890,208 to D. M. Young et al, patented June 9, 1959; U.S. Pat. No. 3,169,945 to F. Hostettler et al, patented Jan. 16, 1965; and U.S. Pat. No. 3,284,417 to F. Hostettler, patented Nov. 8, 1966.

Other suitable carboxyl containing polymers of cyclic esters and methods for the production thereof are described in U.S. Pat. No. 3,408,421 to K. A. Kurka, patented Oct. 29, 1968.

In formulating the compositions of this invention which are to be used in molding applications such as sheet molding, premix and preform, it is customary to admix, with the unsaturated polyesters and the polymers of cyclic esters, the following materials:

1. A polymerizable ethylenically unsaturated monomer which serves to cross-link the unsaturated polyester to a thermoset product.
2. A peroxide which serves to accelerate the cross-linking reaction.
3. A thickening agent which serves to provide body to the compositions by increasing the viscosity of the polyesters.
4. Fillers, including fillers which serve as reinforcing agents.

Illustrative of suitable polymerizable, ethylenically unsaturated monomers are the vinyl monomers having the formula:

Formula VII

$$CH_2 = CH - R$$

wherein R is a group having an unsaturated carbon-to-carbon, carbon-to-oxygen, or carbon-to-nitrogen group in conjugation with the vinyl group. Groups having such unsaturation in conjugation with the vinyl group are aryl, ketonic, heterocyclic, nitrile, carbalkoxy, carboxy and amido.

Specific vinyl monomers include the following:

Wherein R is aryl; styrene, halogenated styrenes such as chlorostyrene, p-iodo styrene, m-flurostyrene, dichlorostyrene and the like; alkyl substituted styrenes such as p-methyl styrene, p-ethyl styrene, o-tert-butyl styrene and the like; alkoxy and aryloxy substituted styrenes such as p-ethoxy styrene, p-propoxy styrene, p-phenoxy styrene and the like; vinyl toluene and the like;

Wherein R is ketonic; ethyl vinyl ketone, n-propyl vinyl ketone, phenyl vinyl ketone and the like;

Wherein R is heterocyclic; vinyl pyridine, vinyl quinoline, vinyl pyrrole, vinyl carbazole, vinyl thiophene and the like;

Wherein R is nitrile; acrylonitrile and the like;

Wherein R is amido; acrylamide, bicycloheptylacrylamide, diacetoneacrylamide and the like;

Wherein R is carboxy; acrylic acid and the like;

Wherein R is carbalkoxy, methyl acrylate, butyl acrylate, octyl acrylate, lauryl acrylate, cyclohexyl acrylate, phenyl acrylate, benzyl acrylate, diallyl-phthalate and the like.

The amount of ethylenically unsaturated monomer used can vary over wide limits. For example, the monomer can be used in amounts of about 10 to about 60 percent by weight based on the combined weight of the monomer and the unsaturated polyester. It is preferred to use about 20 to about 50 percent by weight ethylenically unsaturated monomer, based on the combined weight of the monomer and unsaturated polyester.

Among suitable peroxides that can be used are those which function as free-radical polymerization initiators. Examples of such peroxides are the hydroperoxides such as tert-butyl-hydroperoxide, cumene hydroperoxide, para-menthane-hydroperoxide and the like; peroxy esters such as di-tert-butyl-diperoxyphthalate, tert-butyl-peroxyacetate and the like; alkyl peroxides such as di-tert-butyl peroxide, dibenzyl peroxide and the like; ketone peroxides such as methyl ethyl ketone peroxide, cyclohexanone peroxide and the like; acyl peroxides such as benzoyl peroxide, parachlorobenzyl peroxide, 2,4-dichlorobenzoyl peroxide, lauroyl peroxide and the like.

The amount of peroxide used is sufficient to effect a cross-linking or thermosetting of the composition in a relatively short period of time. As a rule, the amount used is about 0.1 to about 5 percent and preferably about 0.5 to about 2 percent by weight based on the weight of the unsaturated polyester.

Among suitable thickening agents are the oxides and hydroxides of metals of Groups I, II and IV of the Periodic Table (Handbook of Chemistry and Physics - 50th Edition). Illustrative of specific oxides and hydroxides of the metals noted are the following: magnesium oxide, calcium oxide, zinc oxide, barium oxide, potassium oxide, magnesium hydroxide, and calcium hydroxide, titanium oxide, lead oxide, and the like.

The thickening agents are used in amounts of about 0.5 to about 75 and preferably in amounts of about 1 to about 5 percent by weight based on the weight of the unsaturated polyesters.

Fillers which are commonly employed in polyester compositions include, among others, glass fibers, clay, calcium carbonate, silica, hydrated alumina and the like. These materials are generally used in amounts of about 20 to about 80 percent by weight based on the weight of the unsaturated polyester.

The compositions of this invention can be prepared by mixing the components in a suitable apparatus such as a Cowles dissolver, at temperatures on the order of about 23° C. to about 50° C.

Once formulated, the compositions can be formed into sheets using any suitable apparatus and thereafter molded into thermoset articles of desired shape, particularly thermoset articles such as automobile fenders, dashboards and the like. The actual molding cycle will, of course, depend upon the exact composition being molded. Suitable molding cycles are conducted at temperatures on the order of about 250° F. to about 350° F. for periods of time ranging from about 0.5 minute to about 5 minutes.

The following examples further illustrate the present invention and are not intended to limit the scope thereof in any manner.

EXAMPLE 1

Into a three-necked reaction flask, equipped with a mechanical stirrer, thermometer, gas-inlet tube and steam condenser, there was charged maleic acid anhydride, phthalic acid and propylene glycol (propanediol-1,2) in a molar ratio of 3.0 moles of maleic acid anhydride, 1.0 mole of phthalic acid anhydride and 4.4 moles of propylene glycol. The mixture was heated to a temperature of 200° C. and maintained at 200° C., while under a nitrogen gas atmosphere, for 8 hours. At the end of 8 hours, the polyester produced, which had an acid number of 35, was cooled to a temperature of 150° C. and 0.014 percent by weight, based on the weight of polyester, hydroquinone added thereto. Styrene was then admixed with the unsaturated polyester to obtain a solution containing 30 percent by weight styrene.

Five hundred gram portions of the unsaturated resin-styrene solution, to which had been added 500 grams of calcium carbonate, were placed in a quart can and to this mixture there was then added 60 grams of a low-profile additive and an additional 90 grams of styrene. This mixture was blended in a Cowles dissolver which was operating at a speed of 800 rpm. Blending was continued until the temperature of the blend reached 90°–95° F. At this point, 15 grams of calcium hydroxide were added to the mixture and blending was continued for 30 seconds. The mixtures were then placed in a water bath which was at a temperature of 100° F. and gelled or B-staged for 60 minutes to a thickened state.

The thickened compositions were then examined visually. The results of the visual examination are noted below, along with the low-profile additive which was used in each composition.

| Additive in composition tested | Results |
| --- | --- |
| Composition A—poly(-ϵ-caprolactone) end-capped with phthalic acid groups. | Thickened with no migration to the surface by the additive. Surfaces were tack free. |
| Composition B—poly(-ϵ-caprolactone) water-initiated. | Thickened with no migration to the surface by the additive. Surfaces were tack free. |
| Control 1—poly(methyl methacrylate) having a reduced viscosity of 0.3. | Additive migrated to surface. Surfaces were sticky. |

The polycarboxylic end-capped poly(-ϵ-caprolactone) of Composition A was prepared as follows:

Into a reaction flask which contained 200 lbs. of ϵ-caprolactone, there was charged, with agitation, 4 lbs. of diethylene glycol (an initiator providing hydroxyl end groups) and then 0.04 lb. stannous octoate. The mixture was brought to and maintained at a temperature of 130° C. for 2 hours. At the end of this 2-hour period, the temperature of the mixture was raised to and maintained at 180° C. for another 2 hours. The reacted mixture was then cooled to a temperature of 100°–130° C. and 12 lbs. of phthalic acid anhydride added thereto. The resultant mixture was maintained for 3 hours at a temperature of 125° C. The resultant polymer, poly(-ϵ-caprolactone) end-capped with phthalic acid, groups, was discharged from the reaction flask and formed into flakes.

The polymer had a reduced viscosity of 0.2 and contained two carboxyl groups per molecular as determined by acid number determination.

The poly( -caprolactone) of Composition B was prepared as described above using water, in lieu of di-ethylene glycol, and omitting the phthalic acid anhydride as the initiator. This polymer had a reduced viscosity of 0.7 and contained one carboxyl group per molecule.

EXAMPLE 2

Five hundred gram portions of the unsaturated resin-styrene solution of Example 1 to which had been added 500 grams of calcium carbonate were placed in a quart can and to this mixture was then added 60 grams of a low-profile additive and an additional 90 grams of styrene. This mixture was blended in a Cowles dissolver which was operating at a speed of 800 rpm. Blending was continued until the temperature of the blend reached 90°–95° F. At this point, 15 grams of calcium hydroxide, 35 grams of benzoyl peroxide and 105 grams of one-fourth of an inch chopped glass fibers were added to the mixtures and blending was continued for 30 seconds. Each mixture was then cast into a sheet one-eighth of an inch thick and gelled or B-staged to a thickened state at room temperature.

The thickened compositions were then examined visually. The results of the visual examination are noted below, along with the low-profile additive which was used in each composition.

| Additive in composition tested | Results |
| --- | --- |
| Composition C—poly(-ϵ-caprolactone) end-capped with phthalic acid groups—(same additive as in Composition A). | Thickened with no migration to the surface by the additive. Surfaces were tack free. |
| Composition D—poly(-ϵ-caprolactone) water-initiated—(same additive as in Composition B). | Thickened with no migration to the surface by the additive. Surfaces were tack free. |
| Control 2—poly(methyl methacrylate) (same as in Control 1). | Additive migrated to surface. Surfaces were sticky. |

Compositions C and D were molded into plaques 12 inches by 12 inches by 0.125 inch in a matched metal mold utilizing the following molding cycle: 2 minutes at 275° C. under a pressure of 500 psig.

The plaques were characterized by excellent impact strength and by excellent surface properties.

The disclosure of all references noted as well as the disclosure of our copending U.S. application Ser. No. 812,383 are incorporated herein by reference.

What is claimed is:

1. In a composition, suitable for use in sheet molding applications and containing an unsaturated polyester and a low-profile additive, the improvement wherein the low profile additive is a polymer of a cyclic ester having an average of at least one carboxyl group per molecule and is present in an amount of about 1 to about 60 percent by weight, based on the weight of said polyester, said polymer of a cyclic ester having a reduced viscosity of at least about 0.1 and a basic recurring unit of the formula:

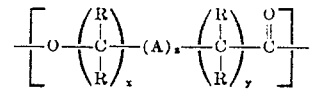

wherein each R is hydrogen, halogen or a monovalent hydrocarbon radical containing a maximum of 12 carbon atoms, A is an oxy group, $x$ is an integer having a value of 1 to 4 inclusive, $y$ is an integer having a value of 1 to 4 inclusive, $z$ is an integer having a value of 0 or 1, with the provisos that (a) the sum of $x + y + z$ is 4 to 6 inclusive and (b) the total number of R variables which are substituents other than hydrogen does not exceed 3.

2. A composition suitable for use in sheet molding applications comprising an unsaturated polyester, a polymerizable ethylenically unsaturated monomer in an amount of about 10 to about 60 percent by weight based on the combined weight of said monomer and said polyester, a thickener which is a Group I, II or IV metal oxide or hydroxide in an amount of about 0.5 to about 75 percent by weight based on the weight of said polyester and a polymer of a cyclic ester in an amount of about 1 to about 60 percent by weight based on the weight of said polyester, said polymer of a cyclic ester having an average of at least one carboxyl group per molecule, a reduced viscosity of at least about 0.1 and a basic recurring unit of the formula:

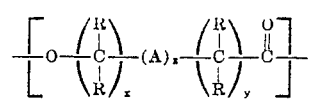

wherein each R is hydrogen, halogen or a monovalent hydrocarbon radical containing a maximum of 12 carbon atoms, A is an oxy group, $x$ is an integer having a value of 1 to 4 inclusive, $y$ is an integer having a value of 1 to 4 inclusive, $z$ is an integer having a value of 0 or 1, with the provisos that (a) the sum of $x + y + z$ is 4 to 6 inclusive and (b) the total number of R variables which are substituents other than hydrogen does not exceed 3.

3. A composition as defined in claim 2 wherein: the ethylenically unsaturated monomer is present in an amount of about 20 to about 50 percent by weight based on the combined weight of said monomer and said polyester; the Group I, II or IV metal oxide or hydroxide is present in an amount of about 1 to about 5 percent by weight based on the weight of said polyester; and the polymer of a cyclic ester having an average of at least one carboxyl group per molecule is present in an amount of about 1 to about 40 percent by weight based on the weight of the said polyester.

4. A composition as defined in claim 2 wherein the polymer of a cyclic ester is characterized by repeating units one of which is defined in claim 2 and the other of which has the formula:

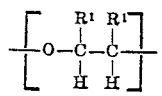

wherein R¹ is as defined for R.

5. A composition as defined in claim 2 wherein the polymer of a cyclic ester has a basic recurring unit of the formula:

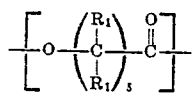

wherein each $R_1$ is hydrogen or alkyl having a maximum of four carbon atoms and with the proviso that no more than three $R_1$'s are substituents other than hydrogen.

6. A composition as defined in claim 2 wherein the thickener is a Group II metal oxide.

7. A composition as defined in claim 2 wherein the thickener is a Group II metal hydroxide.

8. A composition as defined in claim 2 wherein the thickener is a Group IV metal oxide.

9. A composition as defined in claim 2 wherein the thickener is a Group IV metal hydroxide.

10. A composition as defined in claim 2 wherein the thickener is calcium hydroxide.

11. A composition as defined in claim 2 wherein the polymer of a cyclic ester has an average of one to about 10 carboxyl groups per molecule.

12. A composition as defined in claim 2 wherein the polymer of a cyclic ester has an average of one to about two carboxyl groups per molecule.

13. A composition as defined in claim 2 wherein the unsaturated polyester is a condensation reaction product of a polyol and an unsaturated polycarboxylic acid or anhydride thereof.

14. A composition as defined in claim 13 wherein the unsaturated polyester is a condensation reaction product of a polyol and an acid having the formula:

$$C_nH_{2n-2}(COOH)_2$$

wherein $n$ is an integer having a value of 2 to 20 inclusive.

15. A composition as defined in claim 13 wherein the polyol has the formula:

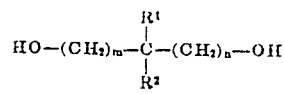

wherein the sum of $m + n$ equals at least one, $R^1$ and $R^2$ are hydrogen or alkyl.

16. A composition as defined in claim 13 wherein the polyol has the formula:

wherein $a$ has a value of at least one, $x$ has a value of at least 2.

17. A composition as defined in claim 13 wherein the polyol is ethylene glycol and the acid is fumaric acid.

18. A composition as defined in claim 13 wherein the polyol is propylene glycol and the acid anhydride is maleic acid anhydride.

19. A composition as defined in claim 2 wherein the ethylenically unsaturated monomer is a vinyl monomer.

20. A composition as defined in claim 19 wherein the vinyl monomer is styrene.

21. A composition as defined in claim 2 wherein the thickener is a Group I metal oxide.

22. A composition as defined in claim 2 wherein the thickener is a Group I metal hydroxide.

23. A composition as defined in claim 2 containing a peroxide cross-linking agent.

24. The cured product of the composition defined in claim 23.

25. A composition as defined in claim 2 wherein the polymer of a cyclic ester has an average of more than one phthalic acid group per molecule.

* * * * *